United States Patent Office 3,481,479
Patented Dec. 2, 1969

3,481,479
VACUUM FILTER
Edward H. Hoskins and Ralph D. Terhune, Cookeville, Tenn., assignors to Bowser, Inc., Cookeville, Tenn., a corporation of Indiana
Filed June 16, 1967, Ser. No. 646,559
Int. Cl. B01d 35/22, 29/04, 29/02
U.S. Cl. 210—484          7 Claims

ABSTRACT OF THE DISCLOSURE

A liquid precoat filter is constructed with porous material in the form of plates having main parallel surfaces and scaled edges to form a chamber. Supports of porous material are positioned in the chamber between the main surfaces so that no filter area is lost. The plates are covered with a closely woven material which may be coated with a filter material.

BACKGROUND OF THE INVENTION

Our invention relates to liquid filters and particularly to liquid filters of the leaf or plate type. Liquid filters, particularly water filters for swimming pools, are being used in increasing quantities. Along with this increased use is the increased demand on the filter capacity. The capacity of a liquid filter, such as a liquid filter which operates under a vacuum, is directly related to its filtering area. Where the space or volume available for a filter is limited, the filter capacity is limited to the filtering area of the filter. Hence, the filter industry is always seeking a liquid filter which has more filtering area for a given volume or space of filter.

Accordingly, an object of our invention is to provide an improved liquid filter which utilizes available space with a relatively high degree of efficiency.

Another object of our invention is to provide a liquid filter that has a larger filtering area than previously known filters.

Frequency, the space available for filters is of a rectangular construction. That is, buildings and other structures are often rectangular in configuration. Presently available filters which fit into rectangular spaces do not have as large a filtering area as is desirable.

Accordingly, another object of our invention is to provide an improved rectangularly shaped filter which has a larger filtering area than previously known rectangularly shaped filters.

In addition to the desirability of filters utilizing the available space in the most efficient manner, it is also desirable that the filters be readily cleaned. The ease of cleaning filters is dependent, among other things, on how closely the filters are positioned together. Where the filters are positioned closely together to utilize available space efficiently, the close spacing of these filters may make them difficult to clean. In some instances, it may be necessary to completely remove the filters from their location in order to clean them.

Accordingly, a further object of our invention is to provide a liquid filter of rectangular shape and increased filtering capacity, and which can be easily cleaned without being removed.

SUMMARY OF THE INVENTION

Briefly, these and other objects are achieved in accordance with our invention by a filter having two plates or leaves, which are preferably rectangular, and which are made of a porous material. The plates are positioned with their main surfaces relatively close and parallel to each other, and are joined or sealed around their edges with porous material to form an internal chamber. Supports or spacers of porous material are fastened between the facing surfaces of the plates to provide support against external pressure. An exhaust port is connected to the internal chamber for connection to a vacuum or exhaust pump. The joined plates are covered with or wrapped in suitable filter material, such as closely woven polyethylene. One or more of these filters may be placed in a suitable container, usually rectangular in shape, which receives the liquid to be filtered through an inlet. The exhaust ports of the one or more filters are connected to an exhaust pump which draws the liquid through the filter material which filters the liquid as it passes through. The filtered liquid enters the internal chamber and is pumped back to the desired location for further use. As the filters are used, the filter material becomes dirty or loaded with foreign matter and contaminants removed from the liquid. The foreign matter and contaminants usually pack or cake on the filter material and are removed by sluicing the leaves with a jet of water, or by closing the container inlet and pumping liquid into the exhaust ports of the filters. This reverse flow of liquid knocks the caked foreign matter and contaminants off of the filter material. The foreign matter and contaminants fall to the bottom of the container where they can be easily removed.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

FIGURE 2a shows a perspective view of one of the filters in accordance with our invention, portions of the filter being broken away to show its internal construction;

FIGURES 2b and 2c show perspective views of two embodiments of the filter construction for FIGURE 2a;

FIGURE 3 shows a cross-sectional view of a filter in accordance with our invention, the cross-sectional view being taken along the lines 3—3 in FIGURE 2a.

DESCRIPTION OF THE PREFERRED EMBODIMENT

Figure 1:
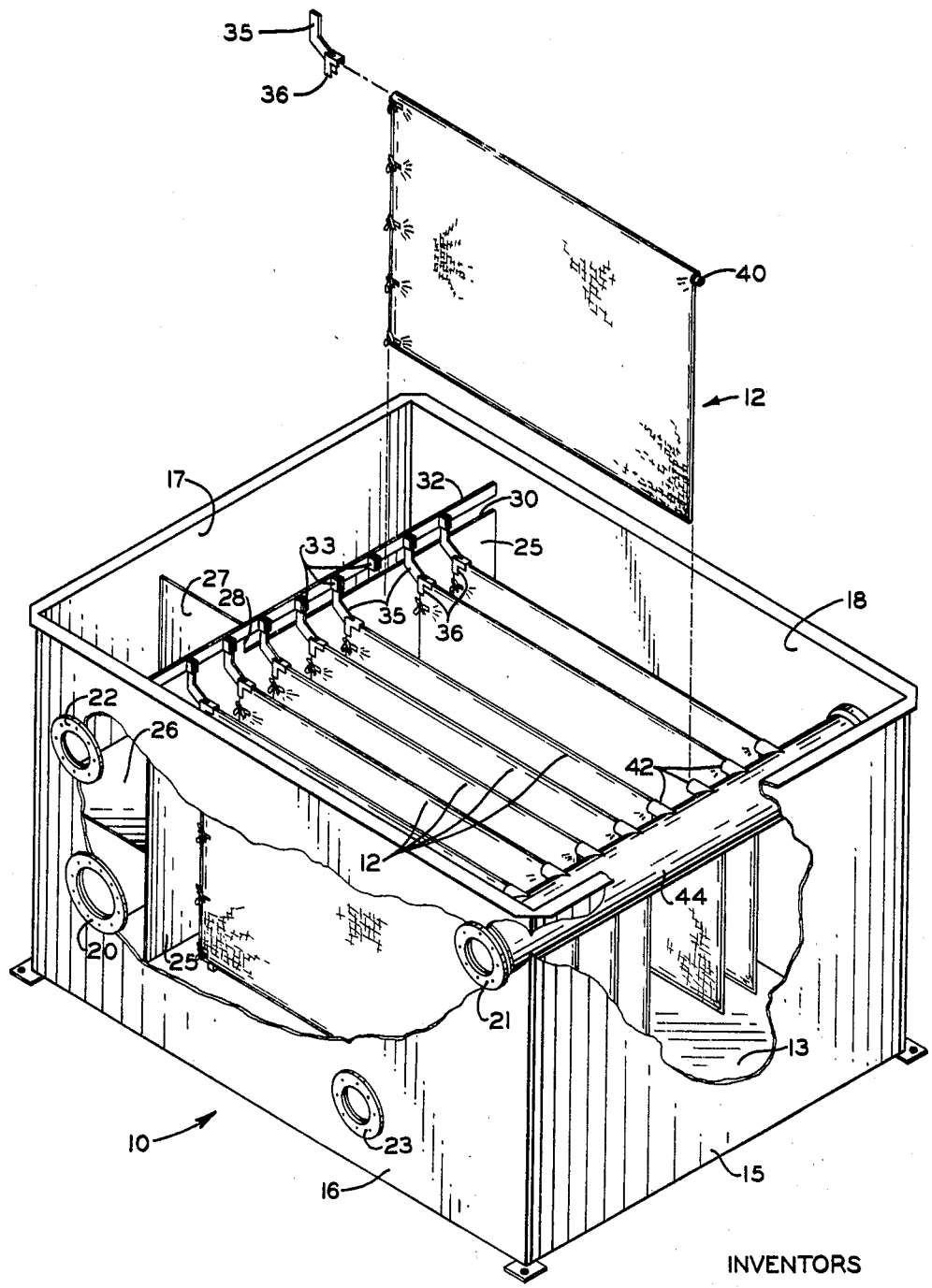
FIGURE 1 shows a perspective view of a container having a plurality of filters in accordance with our invention, the container having portions broken away to show the internal construction more clearly.

FIGURE 1 shows a container 10 which is constructed to house a plurality of filters 12 in accordance with our invention. The container 10 is generally rectangular in shape, and is constructed of suitable sheet material such as steel or fiber glass. The container 10 comprises a bottom 13, a side 15, a front 16, a side 17, a back 18, and top (not shown). One of the sides, the front 16 in FIGURE 1, is provided with an inlet 20 positioned relatively close to the bottom 13 near one corner. The front 16 is provided with an outlet 21 positioned relatively near the top of the container 10 at the diagonally opposite corner. The front 16 is also provided with an overflow 22 positioned relatively near the top above the inlet 20, and a drain 23 positioned relatively near the bottom 13 beneath the outlet 21. The inlet 20, the outlet 21, the overflow 22, and the drain 23 preferably have a cylindrical opening with a flange which is provided with threaded screws to facilitate attaching a pipe or other connection to the respective members. A baffle plate 25 is fastened between the front 16, the back 18, and the bottom 13, and extends parallel to the two sides 15, 17. A baffle plate is spaced from the side 17 sufficiently far so as to be spaced beyond the inlet 20. The baffle plate 25 is fastened to the front 16, the back 18, and the bottom 13 along the entire length with a watertight connection. An overflow chamber is formed adjacent the overflow 22 by a horizontal overflow plate 26 and a vertical overflow plate 27. The horizontal overflow plate 26 extends from the front 16 back to the plate 27, and is fastened with a water-tight connection around its edges to the front 16, the baffle plate 25, the overflow plate 27, and the side 17. The vertical overflow plate 27 extends upwardly from the horizontal overflow plate 26, and is fastened with a water-tight connection around its edges to the horizontal overflow plate 26, the baffle plate 25, and the side 17. The upper edge of the vertical overflow plate 27 is spaced a relatively small predetermined distance below the top of the container 10. The baffle plate 25 extends vertically upward to the height of the vertical overflow plate 27 between the front 16 and the vertical overflow plate 27. At the plate 27, the baffle plate 25 is notched or stepped downward at the point 28 to provide an overflow edge 30 which extends from the vertical overflow plate 27 back to the rear 18. Thus, liquid to be filtered may enter the inlet 20, pass under the overflow plate 26, rise up to the top edge 30 of the baffle plate 25, and pass over this edge 30 into the space occupied by the filters 12.

Figure 2:
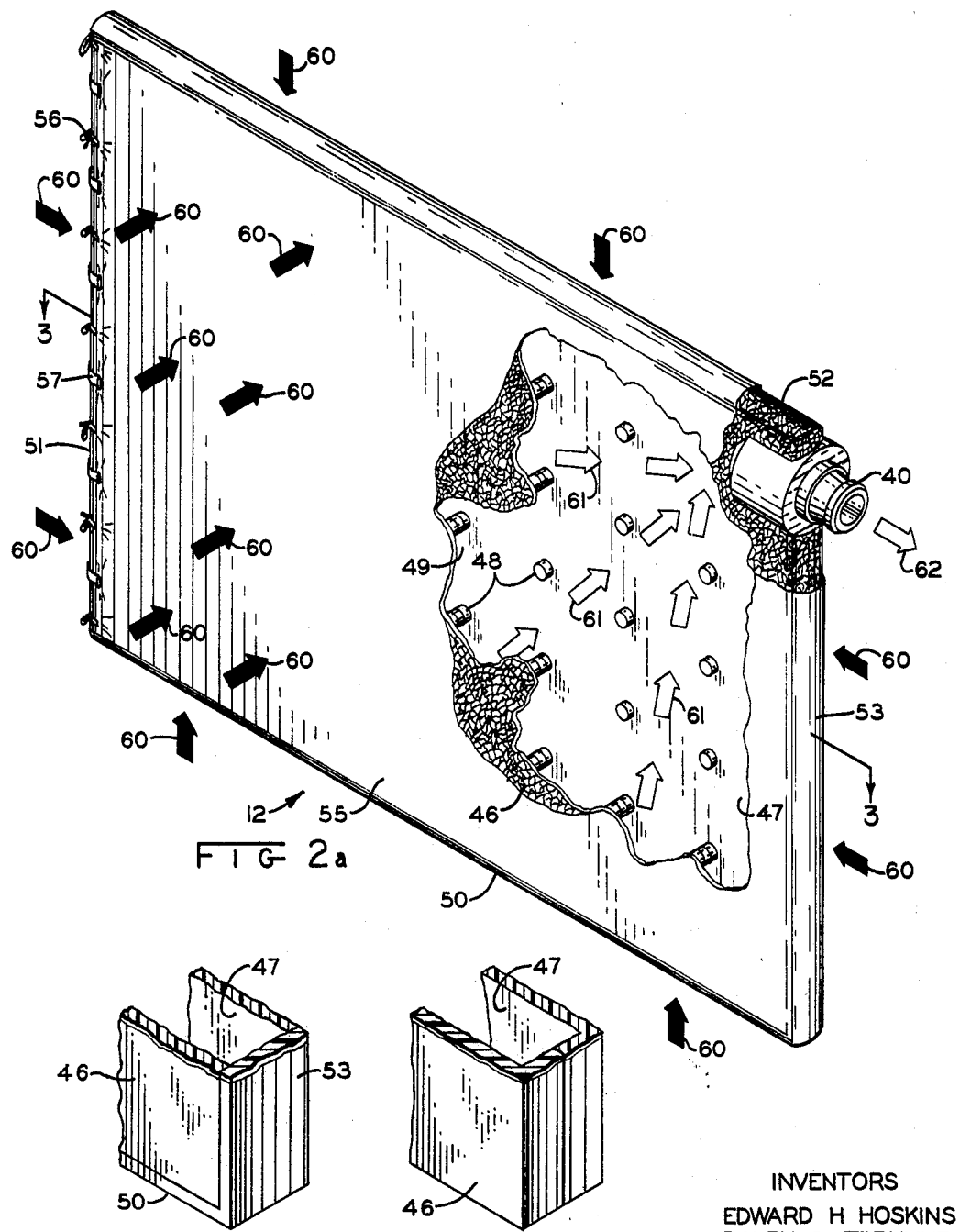

The filters 12 are rectangularly shaped plate-like elements, and are supported at one end by a clip bar 32 which has a plurality of clips 33. These clips 33 are formed by two closely spaced plates which receive and hold one end of a filter positioner 35. The positioner 35 has a filter support clip 36 at its other end. This support clip 36 is arranged to fit over and hold a filter 12. The filter 12 has an interior chamber which will be described and which is connected to an exhaust port or outlet 40 (shown in FIGURE 2) which preferably is positioned at or near one of its upper corners so as to be self-venting. The exhaust port or outlet 40 may be threaded or otherwise arranged so as to be connected to a manifold inlet 42 on an exhaust or outlet manifold 44. The outlet manifold 44 may be a cylindrical pipe or other suitably shaped piece having the manifold inlets 42 positioned along a line at preferably equally spaced locations so as to receive the outlets 40. The outlet manifold 44 communicates with the outlet 21, and is supported by and closed at its other end adjacent the rear 18. The outlet 21 may be connected by a suitable pipe or other connection (not shown) to a vacuum pump (not shown) which draws liquid which has been filtered and which is in the outlet manifold 44, and pumps this liquid to any desired location, such as back to a swimming pool.

The filter arrangement of FIGURE 1 is connected in a system with the inlet 20 connected to the source of liquid to be filtered, usually a swimming pool. The outlet 21 is connected to a pump whose output leads back to the swimming pool. The overflow 22 is connected to a suitable liquid discharge receptacle, or to a receptacle which permits the liquid to be filtered at a later time. The drain 23 is connected to a drainage connection, and is normally closed. With the filter arrangement of FIGURE 1 in operation in a system, the pump creates a vacuum in the manifold 44 and in the interior chambers of the filters 12. This draws the liquid around the filters 12 through the filters 12 so that the liquid is filtered. The filtered liquid is pumped back to the swimming pool or other receptacle where it can be used again. As the swimming pool or other receptacle receives the filtered liquid, other liquid overflows and enters the inlet 20. The inlet 20 thus replenishes the liquid in the container 10 so that the liquid to be filtered usually has a depth or height in the container 10 that is just at the top edge 30 of the baffle plate 25. If the liquid tends to rise higher than the edge 30, it can pass over the vertical overflow plate 27 and out through the overflow 22.

The filters 12 shown in FIGURE 1 have a relatively large area, but a relatively small or thin thickness. This configuration permits a relatively large number of such filters to be placed in the container 10, with the result that relatively efficient utilization of space is made. This efficient utilization of space thus provides a relatively high rate or capacity of filtering, or both, and hence makes the filter construction preferable over prior art arrangements which did not utilize available space so efficiently.

Figure 3:
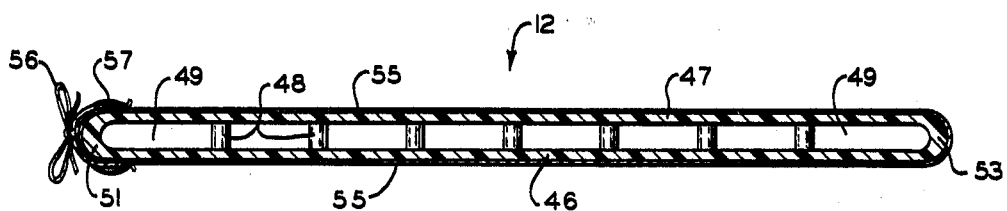

The construction of one of the filters 12 is shown in FIGURES 2a, 2b, 2c, and 3. FIGURE 3 is a cross-sectional view taken along the lines 3—3 in FIGURE 2a. The filter 12 comprises two rectangular sheets 46, 47 made of suitable material which is porous. The sheets 46, 47 are preferably made from pellets of a material such as high density polyethylene. The pellets may be formed into a plate by placing them in a mold of the desired shape and heating them until they join or fuse together without melting. Further details of this construction are given in U.S. Patent No. 3,291,310 granted Dec. 13, 1966, and hence need not be described in detail in this application. The two sheets are spaced with their larger surfaces parallel to each other, and spaced a relatively small but suitable distance apart. The sheets are supported in this relation by a plurality of spacer elements 48 which are made of the same porous material and which are positioned in a configuration to provide the necessary strength and rigidity to the two plates 46, 47. The two plates 46, 47 are enclosed at their four edges to form a chamber 49. The enclosure may be provided by four strips 50, 51, 52, 53 positioned along the edges of the plates 46, 47 as shown in FIGURE 2b, and fastened by heating as mentioned above. Or, the plates 46, 47 may be formed with integral narrow strips which provide facing edges that are joined to provide the enclosure as shown in FIGURE 2c. The spacer elements 48 may be formed at the same time as the plates 46, 47, or may be individually formed and fastened to one of the plates 46, 47 so that they abut the other plate. It is preferable that the spacer elements 48 be formed when the plates 46, 47 are formed so that one mold may be used to form plates that can be joined by strips, or to form plates that have integral strips which can be joined. The outlet 40 is formed in one of the strips, such as the strip 53, near an upper corner so that the chamber 49 may be connected to the manifold inlets 42. After the filter 12 has been constructed and the outlet 40 provided, the filter 12 is then covered with a replaceable woven filter material 55. This woven filter material 55 is preferably shaped in the form of a rectangular bag having three sides closed, these sides corresponding to the edges 50, 52, 53 of the filter 12, and having its fourth side open. The edge of the bag corresponding to the edge 53 of the filter 12 is provided with an opening for the outlet 40. One suitable material for the filter material 55 is polyethylene manufactured by the National Filtering Media Company under the number P-2201. This filter material 55 has a sufficiently close weave of less porosity than the plates 46, 47 so that the foreign matter or material to be filtered does not pass through the filter material 55 and reach the plates 46, 47. After the filter material 55 is positioned around the filter 12, it is closed along the edge 51 by suitable ties 56 and clamps 57. A properly designed filter material 55 fits closely over the surfaces of the plates 46, 47, and presents a relatively large filter area on both of the sides 46, 47. In fact, the only portion of the filter 12 which does not provide filtering is at the outlet 40 and possibly at the clamps 56. The edges 50, 51, 52, 53 and the spacer elements 48 permit liquid to flow into the chamber 49. The spacer elements 48 do not reduce the filter area since liquid can flow through the plates 46, 47 into the elements 48 and out of the sides of the elements 48 into the chamber 49.

When the exhaust outlet 40 is connected to the manifold 44 with a pump, the liquid to be filtered passes through the large sides and edges of the filter material 55 in the direction indicated by the arrows 60. As the liquid passes through the filter material 55, and through the plates 46, 47 and edges 50, 51, 52, 53, the liquid then passes in the chamber 49 in the direction indicated by the arrows 61. The liquid passes out through the outlet 40 in the direction shown by the arrow 62.

Figure 4:
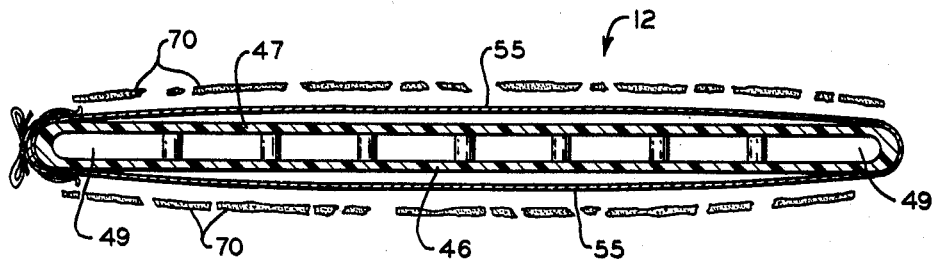
FIGURE 4 shows a cross-sectional view of a filter in accordance with our invention to show how the packed or caked foreign matter and contaminants may be removed.

After the filters 12 have been used for a considerable length of time, they may become dirty or caked with the foreign matter or contaminants and added filter material (such as diatomaceous earth) which has been filtered by the filter material 55. This caked material reduces the flow until the pressure drop between the inlet 20 and the outlet 21 exceeds some magnitude. This excessive pressure drop generally indicates that the filters 12 need cleaning. This is easily accomplished by draining the container 10 and washing the outside of the filters 12 with a suitable stream of water or other liquid. Or the filters 12 can be cleaned by backwashing. Backwashing is easily accomplished by closing the inlet 20 and the overflow 22, and by opening the drain 23. Then, the pump or other device is reversed so as to pump liquid into the outlet 21 and into the manifold 44. This thus causes the liquid to enter the chamber 49 of each of the filters 12. The liquid flows through the sides 46, 47 and tends to flex or balloon the woven filter material 55 outward as shown in FIGURE 4. When the filter material 55 is forced outward, the accumulated dirt or foreign material 70 breaks off and falls to the bottom 13 of the container 10, where it is easily flushed out through the drain 23. Thus, the filter material 55 is easily cleaned without the necessity of the filters 12 being removed. After the dirt or foreign material 70 is removed, the drain 23 is closed, the inlet 20 and overflow 22 are opened, and the filter system put back into its normal operation.

It will thus be seen that our invention provides a new and improved leaf filter having a relatively large filtering area on all six sides of the filter in a relatively small space. And no filtering area is lost by the spacer elements. The filter is particularly adapted to a rectangular container, and permits parallel positioning of filter, which further provides an increased filtering area in a relatively small space. In addition, our filter can be easily cleaned without the necessity of the individual filters being removed. Persons skilled in the art will appreciate that modifications can be made. For example, the plates can be constructed as two identical halves with integral edges or with added edges. The spacer elements may be integral or added. Other porous material may be used, although a fusible material is preferred. And other types and locations of exhaust outlets may be used. A variety of woven filter materials may be used around the plates. Finally, the filters as described may be utilized in a number of different configurations besides the arrangement shown in FIGURE 1. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An improved filter element support comprising:
 (a) first and second substantially similar plates of molded porous pellet material, each of said plates having main surfaces of a length and width substantially greater than its thickness;
 (b) and means joining said plates together at their edges along said length and width respectively with molded porous pellet material, the facing main surfaces of said plates being spaced and parallel to form a closed chamber between said facing main surfaces and said edges.

2. The support of claim 1 wherein said joining means are integral portions of respective plates.

3. The support of claim 1 wherein said joining means are separate strips molded to said plates.

4. The support of claim 1 and further comprising a plurality of spacer elements of porous material positioned between said facing main surfaces.

5. An improved liquid filter for swimming pools and the like comprising:
 (a) a first and second substantially similar plates of molded porous pellet material, each of said plates having substantially rectangular main surfaces of a length and width substantially greater than the thickness of said plates;
 (b) molded porous pellet material means joining said plates along said lengths and widths in spaced, side-by-side relation with said main surfaces substantially parallel to each other and with said lengths and widths correspondingly positioned, said plates and said joining means forming a closed chamber between the facing main surfaces of said plates and the facing surfaces of said joining means;
 (c) an outlet port in said porous material to provide an outlet for said chamber;
 (d) a plurality of spaced support elements of porous material positioned between and joined to said facing main surfaces of said plates;
 (e) a cover of woven material having less porosity than said porous material positioned around said plates and joining means, said cover being in the form of a bag having an opening and having a configuration that is similar to the outer configuration of said plates and joining means;
 (f) and means for closing said cover opening to form a closed cover of filter material.

6. The support of claim 5 wherein said joining means are integral portions of respective plates.

7. The support of claim 5 wherein said joining means are separate strips molded to said plates.

References Cited

UNITED STATES PATENTS

| | | | |
|---|---|---|---|
| 753,453 | 3/1904 | Voindrot et al. | 210—346 |
| 1,753,277 | 4/1930 | Sweetland | 210—486 X |
| 1,905,806 | 4/1933 | Clark | 210—486 X |
| 2,788,901 | 4/1957 | Boeddinghaos et al. | 210—486 |
| 2,845,181 | 7/1958 | Rathe et al. | 210—486 |
| 3,067,504 | 12/1962 | Lubben et al. | 210—486 X |
| 3,291,310 | 12/1966 | Marvel | 210—510 X |

REUBEN FRIEDMAN, Primary Examiner

JOHN W. ADEE, Assistant Examiner

U.S. Cl. X.R.

210—486, 489, 510